(12) United States Patent  
Clerk

(10) Patent No.: US 7,791,497 B2
(45) Date of Patent: Sep. 7, 2010

(54) FLASHING BEACON

(75) Inventor: Frederick George Clerk, Berwick (AU)

(73) Assignee: Embridge Lake Pty Ltd, Notting Hill, Victoria (AU)

( * ) Notice: Subject to any disclaimer, the term of this patent is extended or adjusted under 35 U.S.C. 154(b) by 540 days.

(21) Appl. No.: 11/629,138

(22) PCT Filed: Jun. 7, 2005

(86) PCT No.: PCT/AU2005/000813

§ 371 (c)(1),
(2), (4) Date: Jan. 16, 2008

(87) PCT Pub. No.: WO2005/121637

PCT Pub. Date: Dec. 22, 2005

(65) Prior Publication Data

US 2008/0284612 A1   Nov. 20, 2008

(30) Foreign Application Priority Data

Jun. 8, 2004   (AU) .............................. 2004903121

(51) Int. Cl.
*G08B 5/00*   (2006.01)
(52) U.S. Cl. .............................. 340/815.4; 340/815.45; 340/331; 362/269
(58) Field of Classification Search .............. 340/815.4, 340/815.45, 471, 478, 331, 691.1, 981; 362/282, 362/269, 227, 238, 249.02, 249.09, 268, 362/272, 296.01, 297, 296.07, 341, 346, 362/800
See application file for complete search history.

(56) References Cited

U.S. PATENT DOCUMENTS

| 4,377,802 | A | | 3/1983 | Ferenc |
| 5,160,201 | A | | 11/1992 | Wrobel |
| 5,929,788 | A | * | 7/1999 | Vukosic ................... 340/908.1 |

(Continued)

FOREIGN PATENT DOCUMENTS

CZ   293963 B6   8/2004

(Continued)

*Primary Examiner*—Toan N Pham
(74) *Attorney, Agent, or Firm*—Stevens & Showalter LLP

(57) ABSTRACT

A warning device of the flashing beacon type (2) is provided with a dual light source (14, 16), typically in the form of two LEDs arranged in back to back relationship, in which the light from one light source (14) is transmitted directly from the beacon whereas the light from the other light source (16) is reflected by a compound reflector (18, 20) from a direction which is essentially opposite the direction of the light from the first source to a direction which is the same as or substantially parallel to the direction of the first source so as to produce a compound beam of illumination having a relatively darker first peripheral part, a relatively more intense central part followed by a relatively less intense third peripheral part. The two light sources and the compound reflector rotates in unison with each other to produce flashes of illumination to a person observing the beacon from a remote location to the beacon. The compound reflector may be a retro reflective element (20) mounted within a concave reflector (18). The advantage of this flashing beacon is that it has similar light characteristics to a conventional incandescent bulb rotating beacon but requires less power and has greater reliability as well as having two separate light sources independently producing illumination.

21 Claims, 2 Drawing Sheets

U.S. PATENT DOCUMENTS

Figure 1:
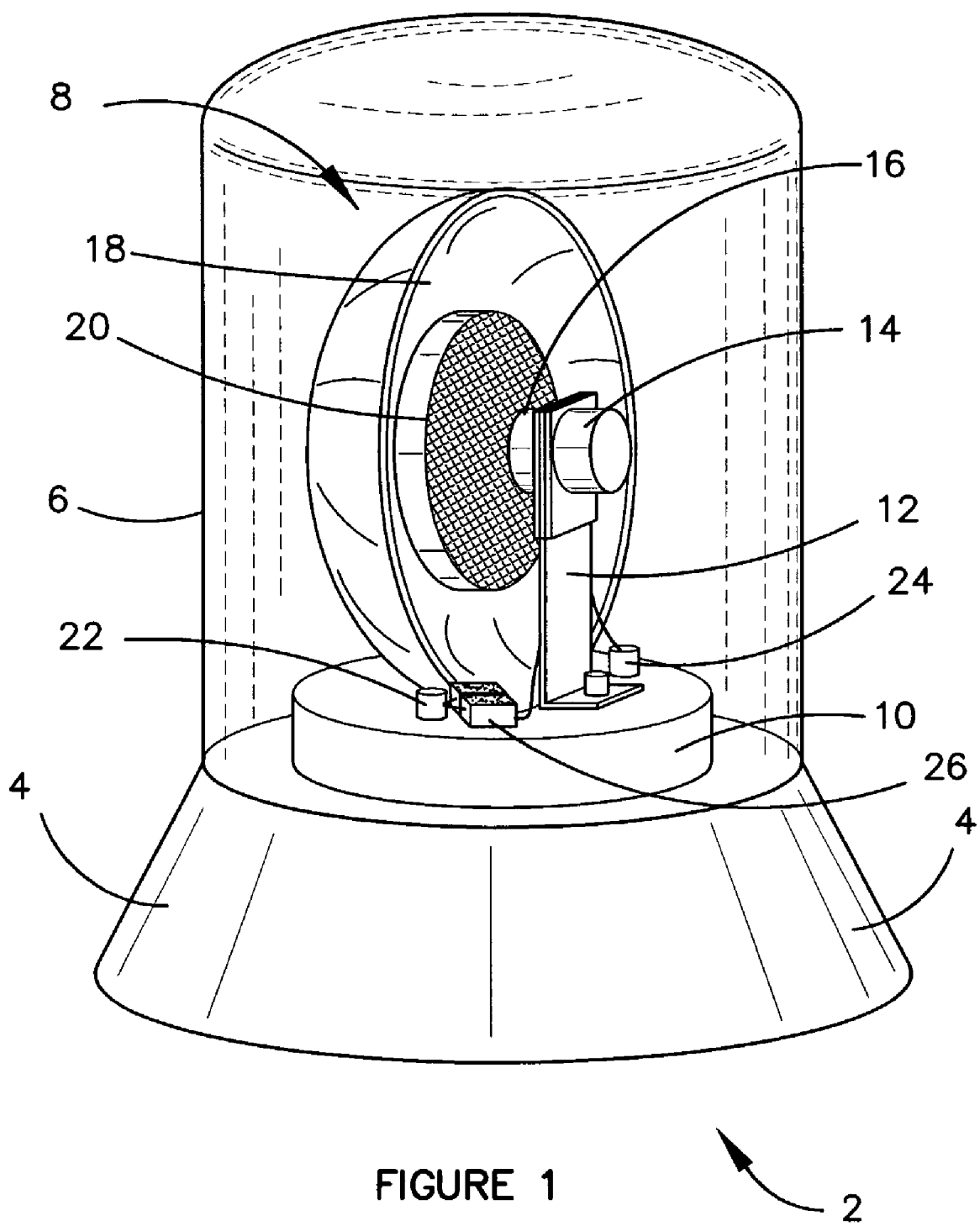

| | | |
|---|---|---|
| 6,483,254 B2 * | 11/2002 | Vo et al. .................. 315/241 S |
| 7,568,821 B2 * | 8/2009 | Peck et al. .................. 362/341 |
| 2002/0114161 A1 | 8/2002 | Barnett |

FOREIGN PATENT DOCUMENTS

| | | |
|---|---|---|
| JP | 04-73802 A | 3/1992 |
| JP | 2001-206267 A | 7/2001 |
| JP | 2001-236801 A | 8/2001 |

\* cited by examiner

FLASHING BEACON

The present invention relates generally to warning devices in which light is emitted periodically and in regularly repeating bursts or flashes or has the appearance of being emitted in regularly repeating bursts or flashes. The present invention relates to warning lights, hazard beacons or other device from which flashes of light appear to be emitted in a predetermined sequence, particularly a regularly repeating periodic sequence. More particularly, the present invention relates to flashing beacons having a continuously emitting light source and a revolving reflector arrangement from which light is continuously emitted but having the appearance of a flashing light when viewed from a fixed location with respect to the light source. Even more particularly the present invention relates to a flashing beacon of the type used to warn of hazardous situations which has a uni-directional beam or beams of light that are visable at different times throughout 360° about the beacon. The present invention finds particular application as a new form of flashing beacon which is provided with at least one uni-directional substantially continuously emitting light source and at least one reflector surface that are simultaneously rotatable in unison with each other to produce a light beam having the appearance of a flashing or pulsating beacon or similar when viewed from a single fixed location with respect to the location of the light source which light beam is in effect an omni-directional light beam. Even more particularly, the present invention finds application as a flashing beacon or similar in which there is more than a single light source and the two or more light sources produce beams of light that are components of the combined light emitted from the beacon.

Although the present invention will be described with particular reference to one form of a flashing light beacon in which the light emitted from the beacon is made up of at least two components, it is to be noted that the present invention is not restricted in scope to the described embodiment or embodiments but rather the scope of the present invention is more extensive so as to include other arrangements and forms of the warning device, other arrangements and forms of the light source and/or reflector and the use of such devices in other applications, including other combinations of light sources, reflectors, beams and similar.

Existing high visibility flashing light beacons have either a periodically pulsating light source or a rotating reflector to achieve fluctuations in intensity of light having the appearances of flashes when viewed from a fixed point relative into the position of the flashing beacon. Some examples of high visibility flashing light beacons use as their light source an incandescent light source in the form of an incandescent bulb or globe in combination with a motor driven reflector which rotates through 360° around the central axis of the fixed light source. To an observer located at a fixed point at a distance from the flashing beacon the fixed light source and rotating reflector combination produces the effect of or appearance of intense flashes of light having a frequency of flashing in accordance with the rate of rotation of the reflector. The intensity of the light of each apparent flash, the duration of the flash and the frequency of the flashes are the same for each observer of the beacon irrespective of the viewing angle of the observer or the location of the observer of the illumination through 360° around the beacon when viewed in a plane perpendicular to the vertical axis of the beacon. Therefore, a person standing in a plane perpendicular to the vertical axis of the beacon sees the same intensity of light flash at the same frequency for the same duration no matter from where the beacon is viewed. Such beacons are often used as high visibility warning devices on emergency vehicles such as road vehicles attending an accident or emergency, vehicles used in factories, industrial establishments or the like such as fork lifts or similar conveyances travelling through the establishment, such as a factory, warehouse or similar from one place to another, particularly in congested areas or areas shared by pedestrians and vehicles, or as hazard warning devices in many applications such as to warn of a hazardous area, incident or the like, such as for example a chemical spill.

Such warning beacons suffer from one or more disadvantages or short comings. One problem relates to incandescent globe failure which is a major problem when the device is used in a critical warning application. Typically, commercially available beacons rely on filament globes having a limited operational life such as for example, about 2000 hours or less. Although some specialist incandescent globes having a life of 9000 hours or more are available their use is not widespread in warning beacons. Typically, a globe having a 2000 hour life will fail within three months of continuous use or if a 9000 hour globe is used its working life will be just over 12 months. Globe failure corresponds to beacon failure because if the globe fails, so also does the beacon cease to warn of the hazard merely because there is no light source to be radiated or reflected. Such a failure can result in serious consequences including loss of life, injury and/or damage. Furthermore, owing to the relatively harsh environment in which hazard warning lights or flashing beacons are used, the useful working life of the globe is often shortened from the maximum working life, sometimes considerably so or, optimal light output is reduced. Causes of premature failure, accelerated wear and short working life include mechanical shock, vibration or the like or resulting from the warning device operating in adverse weather conditions, harsh environments or the like all leading to premature failure of the light source, and the warning light itself.

A further shortcoming of such warning beacons relates to the very high power that is required to operate such devices in order for the beacons to be able to produce the required intensity of light. As an example, power of the order of about 35 to 70 watts or is required to operate high visibility units having a high intensity incandescent globe. If such beacons are operated at low voltage such as for example at 12 volts or similar the current necessary to energize such lights is in the order of 3 to 6 amps which is very considerable. Special precautions and heavy duty fittings are often required to handle such high currents. Even if higher voltages are used with fixed installations, thereby reducing the current required, there is the added cost of providing secure mains wiring or the use of high current DC power supplies to power the beacons.

A further problem associated with existing beacons of this type relates to the amount of heat generated by a typical incandescent globe during use of the light beacon which again is very considerable. As the heat source i.e. mainly the globe, is contained wholly within the beacon housing and lens assembly such devices operate at elevated temperatures which induces stress in the globe and/or nearby components resulting in premature failure which requires more intensive maintenance as well as the extra cost of replacing the components and the globe, sometimes after only a very short time.

Another disadvantage of using incandescent beacons is the lack of an inherent fail safe feature since such beacons employ a single bulb only as the light source. Therefore, as soon as the light fails, so does the beacon, since as soon as the bulb ceases to provide illumination the beacon is ineffective. Thus, there is no inherent fail safe arrangement provided in light beacons to enable partial but still usable function of the beacon to be maintained in the event that the single incandescent bulb should fail until corrective maintenance can be carried out and at least the bulb be replaced.

Attempts to overcome the disadvantages and shortcomings of beacons using incandescent light sources have included the substitution of such light sources by alternative light sources. Examples of alternative light sources include advanced light sources such as zenon flash tubes, light emitting diodes (LEDs) or similar light producing devices. The introduction of such devices has enabled the production of non-mechanically rotating versions of the beacons, particularly versions in which the reflector is either absent or does not need to rotate to produce the "flashing" effect of the light. However, illumination produced by a zenon flash tube is of a very short duration owing to the very short time of discharge of the zenon tube in which illumination is produced and emitted.

On the other hand LEDs are unidirectional in that light is emitted from such devices in a single direction only. Such static non rotating emitters using a discharge tube or electronically sequenced static arrays of LEDs lack the superior optical performance of the rotating reflector incandescent beacons described above.

Thus, the substitution of incandescent bulbs by LEDs has not been entirely successful owing to the uni-directional nature of the illumination coming from the LEDs rather than the omni-directional nature of the illumination from incandescent filaments. Also, owing to the relatively large physical size of the LEDs it is difficult or impractical to cluster multiple LEDs together in groups to replicate the omni-directional emission of the incandescent bulb. Without the illumination of the LEDs being regarded as being omni-directional i.e. observable from all angles around 360° with about the same intensity of illumination, the directional LEDs can not be used in traditional rotating reflector beacons as they do not produce the appearance or effect of a high intensity periodic flash that is observable from all positions around the light.

Additionally, multiple high intensity LEDs are required to produce a light output equal to the output of a single incandescent bulb. This adds to the cost and complexity of beacons using LED's.

Even though high power LEDs, typically from about 1 to 5 watt, are available that produce greater intensity light such LEDs are still directional and do not produce an omni-directional beam of light.

Other attempts to replicate the omni-directionality of the rotating reflector incandescent light beacons have failed owing to the very large number of LEDs that are required to simulate the omni-directionality of the beacons. Also, the patterns of illumination produced from multiple LEDs have not resulted in a uniform or constant illumination when viewed from all points or angles around 360° about the light sources. Instead areas of relative dark and relative light are produced which varies from position to position depending upon where an observer is located relative to the position of the beacon.

As an example several vertical columns of LEDs have been arranged in a circular array inside a beacon lens housing, and the columns have been electronically switched on and off in sequence, such as by using digital electronics to simulate a rotating light source with somewhat similar characteristics to the mechanical/incandescent beacon. At present, these designs require many LED emitters to ensure that there are no gaps evident in the pattern of light emitted from the beacon. Despite this, the luminous intensity of each emitter LED varies over its area of illumination, typically a conical beam front, with the highest intensity being typically along the centreline axis of the beam. Therefore, the intensity apparent to an observer moving around the perimeter of a circle of given radius from such a stationary beacon will tend to vary, depending on the angle of observation. In the event that the array has too few LEDs to give complete 360 degree coverage, there may be darker or dark areas observed from certain angles. This variance does not occur with a traditional fixed bulb—rotating reflector design, because the light output is constant and physically scanned past every viewing point on the circle of observation. Each observer, independent of position on the 360 degree circle, is presented with a similar pulse of light.

Therefore, there is a need to produce a warning beacon which has bright intensity, which is more reliable and which has substantially constant illumination when viewed from 360° about the source.

Accordingly, it is an aim of the present invention to provide a flashing beacon that has at least one or more characteristics of illumination provided by rotating reflector incandescent bulb beacons but is more reliable, has increased life of operation before corrective maintenance is required, requires less power to operate, has a longer working life, has substantially constant light output and has more operational advantages, than such rotating beacons.

According to one aspect of the present invention there is provided a warning device capable of producing illumination having two or more constituent components, said warning device comprising at least a first component of light from a first light source for producing illumination along a first pathway or in a first direction, a second component of light from a second light source for producing illumination at least initially along a second pathway or in a second direction, said first pathway or direction being different to the second pathway or direction at least initially, and a light direction changing element for changing the pathway or direction of one of the first or second pathways or directions of illumination to be the same as or similar to the other pathway or direction wherein at least one, and preferably at least two, of the light sources move substantially in accordance with or in unison with movement of the light changing element so that illumination comprising the two components of light is emitted from the device in which the first component is derived from the first light source and the second component is derived from the second light source.

Typically, the warning device of the present invention is a warning beacon, more typically a flashing beacon, more typically a high visibility flashing light beacon. Even more typically, the flashing beacon has illumination that can be observed as pulses, flashes or bursts of light from any position around 360° about the beacon. Even more typically, the flashes etc. are regularly repeating flashes or have a regularly repeating pattern or sequence of flashes.

Typically, the illumination from the warning device is produced by at least two light sources. More typically there is a first light source and a second light source. More typically, the two light sources can be the same or be different from one another.

Typically, the first light source produces a first pathway or first direction of light or illumination. More typically the first direction or first pathway is uni-directional, typically in a radially outward direction from the light source or beacon. More typically the first pathway or direction is a direct beam of illumination from the first light source, even more typically the first beam includes a beam of illumination that is substantially conical in shape or the like.

Typically, the second light source is uni-directional, so that the pathway or second direction of the light beam is typically a radially inward directed beam of illumination. Even more typically, the second beam is a reflected beam, refracted beam or a beam that has undergone a change or deflection in direction.

Typically, the light source includes a nonincandescent bulb or similar. However, it is to be noted that the use of incandescent bulbs can offer specific improvements in particular embodiments. More typically the light source is a LED device, zenon tube, infra red emitter laser device, or devices emitting infra red, ultra violet or other wavelengths in the electromagnetic spectrum or the like. More typically the one LED device contains the two light sources or two light emitting parts. Even more typically the two light sources are arranged to produce illumination, typically substantially unidirectional illumination, in two different directions. Even more typically the LEDs are mounted in back to back relationship so as to emit simultaneous illumination radially outwardly from the light sources in different directions to each other.

Typically, the two LED light sources are arranged to emit light in directions arranged at about 180° to each other, in substantially opposite directions. More typically one direction is away from the light direction changing element and the other direction is towards the light direction changing element.

Typically, the two LEDs can have the same intensity of light or can have different intensities of light.

If the LEDs have different intensities of light the light from the front LED or radially outwardly directed LED is more intense than for the rear LED or the LED producing the reflected beam by interaction with the light direction changing element. More typically, the direct outwardly directed beam of light produced by the front LED is a high intensity horizontally centred conical beam which is the primary self focussed light source of the beacon.

Typically, the light from the second or rear LED changes direction. More typically, the change in direction is produced by the interaction of the light with the light direction changing element.

Typically, the light direction changing element is a reflector, typically a reflector having a circular, parabolic or other curved surface or substantially curved shaped reflector which focuses illumination from the LED into substantially parallel rays. More typically the reflector reflects light from the second LED into the direction of the first LED so that the directions of the two illuminations are substantially parallel to each other.

More typically, the reflector is a compound reflector, typically having at least two different reflecting surfaces. More typically the reflector includes a circular retro-reflector which is mounted in a concave reflector, typically in the concave reflector apex. Even more typically, the two or more reflectors rotate in unison as a single unit.

Typically, the direct illumination from one LED is one component of the illumination from the beacon and the reflected illumination from the other LED is another component of the illumination from the beacon, said illumination being a combination of both components.

More typically, the illumination is viewed in sequence as a slightly brighter light, then a more intense light then a reduced intensity light as the illumination passes a given point as the beacon rotates in use.

Typically the first and second LED rotate in unison with each other. More typically the LEDs and the reflector rotate in unison with each other. More typically, the reflectors and LEDs form a sub assembly of the beacon, said illumination being a combination of both components.

More typically the subassembly of the warning device is mounted for rotation on a mounting block which is rotatable therewith.

Typically, the beacon is provided with a housing, base or the like and a lens. More typically, the lens has optical characteristics similar to the lens used with conventional incandescent beacons.

Typically, the inwards projecting directionally focussed LED projects its light output directly onto the rotating retro-reflector surface, such that when the reflector combination is observed externally along its focal axis, both the retro-reflector surface and the outer metallised reflector rim appears to be brightly and evenly illuminated, even though the LED source is directional and mounted optically close to the combination surface. In this way, the present invention uses a directional LED to illuminate the reflector combination such that it characteristically simulates the bulb-filament illuminated reflector background observed in a conventional incandescent beacon.

Typically, the obscuration by the body of the LED of the reflected light projecting forwards and outwards from the reflector surface in the one position where the said rearwards projecting LED is mounted, is fully compensated for by having the primary external projecting LED body mounted coaxially in the identical location.

Typically, when the present invention is operating with both the forwardly (primary) and rearwardly (secondary) projecting LEDs illuminated steadily, and the light source and combination reflector are rotating, an observer first sees a lower intensity background illumination followed by an intense central spot of light, and then followed by a lower intensity background illumination as the beacon rotates past the fixed viewing position, while illumination is directed towards the observer. This is followed by a dark period of usually longer duration than the light flash after which the process involving the flash of light is repeated. In this way, the present invention more closely simulates the visual characteristics of the conventional rotating beacon, by simulating both the larger area background illuminated reflector appearance, and also the high visual impact of the more intense filament emission observed from a typical incandescent Beacon. Thus the present invention achieves similar visual characteristics to the conventional beacon, but without many of its aforementioned disadvantages, which are substantially addressed in the present invention.

Typically, the beacon includes a lens. More typically, the lens assist in defining a cavity or chamber. Even more typically, the subassembly of the light source and the reflector is located in the cavity or chamber defined, at least in part, by the lens. Typically, the lens also forms a cover for the beacon and/or light source.

Figure 2:
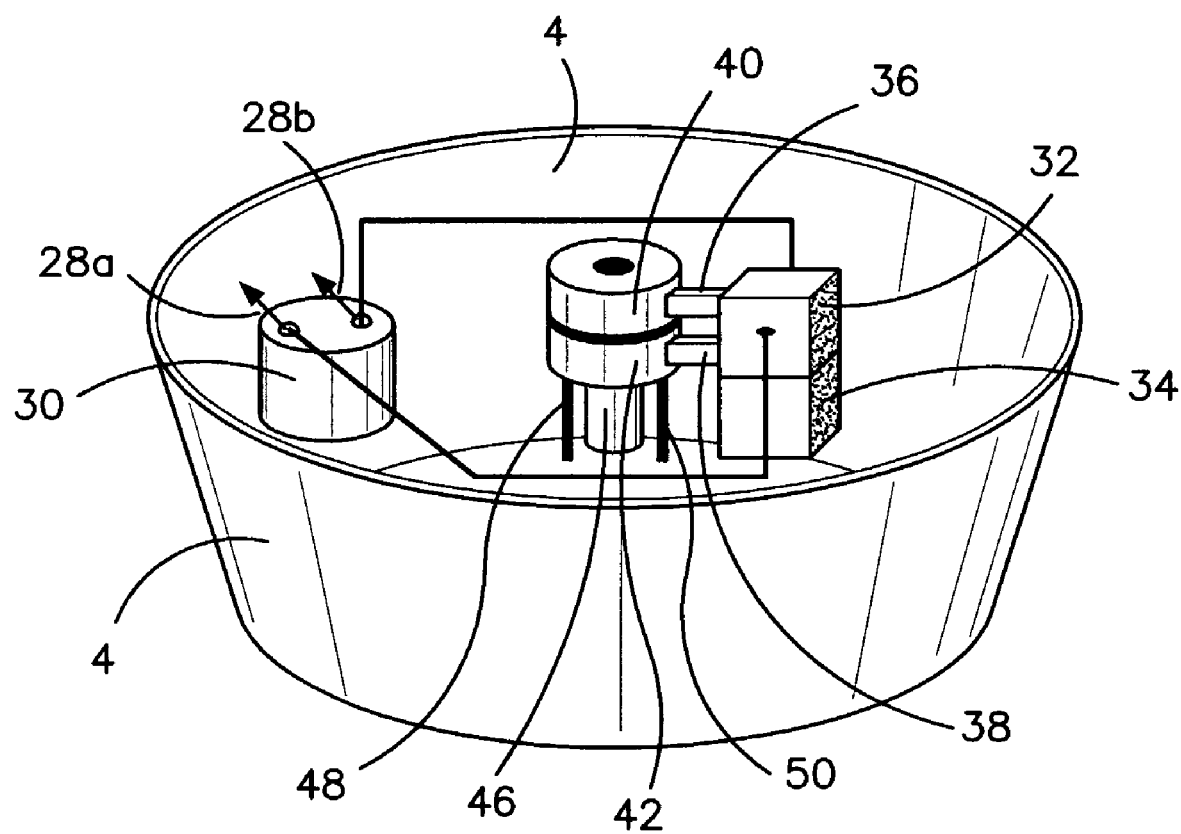

The present invention will now be described by way of non limiting example with reference to the accompanying drawings in which:

FIG. 1 is a schematic side view of one form of the beacon of the present invention, and FIG. 2 is an underneath view of the mounting base for the form of the beacon shown in FIG. 1 when in an inverted position revealing the components located within the base.

In FIGS. 1 and 2, there is shown schematically one form of the high performance beacon of the present invention and the components forming the beacon so as to produce illumination.

The high performance beacon, generally denoted as 2, comprises a fixed mounting base 4 for mounting the beacon 2 to a solid substrate, such as for example a motor vehicle or the like, and a lens 6 removably attachable to base 4. Base 4 can be fixedly mounted on any suitable substrate depending upon circumstances of use of the beacon and the environment in which the beacon is to be used. Base 4 may be a one part construction or may be of a two or more part construction that fits or interlocks together. Lens 6 is clear, transparent, translucent or tinted or the like for transmitting light there through. Lens 6 may be in any suitable colour, shade or tint. Typically lens 6 is an orange, amber, yellow colour or the like that is customarily used for warning devices. Lens 6 may be smooth walled or may be provided with surface irregularities assisting in directing the illumination, such as for example, by focusing or deflecting or bending the light rays. In some embodiments, the lens may be provided with a secondary or auxiliary lens located at a predetermined position with respect to the remainder of the lens.

A rotatable sub assembly, generally denoted as 8 is mounted on base 4 within the chamber defined by lens 6 for rotation with respect to base 4 and lens 6.

Sub assembly 8 comprises rotating platform 10 which is mounted centrally upon the upper surface of base 4, typically concentrically with base 4. Bracket 12 of a generally L shape is fixedly connected to rotating platform 10. The longer arm of bracket 12 extends substantially upwardly in a direction which is substantially aligned longitudinally along the length wise extending central axis of lens 6. It is to be noted that bracket 12 can be located at the center of platform 10 or may be located offset or away from its center.

A first light source in the form of a light emitting diode (LED) 14 is mounted at or towards the top of bracket 12. LED 14 is positioned so that light emanating from LED 14 extends radially outwardly from LED 14 substantially in a horizontal direction or a direction perpendicular to the central axis of lens 6. Further, the beam of light produced by LED 14 has a pre-determined or preselected pattern or shape, such as for example, a conical beam of light that is transmitted through lens 6 for producing a first component of the light or illumination from beacon 2 as will be described in more detail later in this specification.

A second light source, typically in the form of a second LED is also mounted at or towards the top of bracket 12. LED 16 is positioned so that the beam of light from this LED is directed in the opposite direction to the direction of the beam of light from LED 14. The beam of light from LED 16 is also in a substantially horizontal or perpendicular direction. For the sake of convenience, the beam of light from LED 14 is referred to as being in the forward direction whilst the beam from LED 16 is referred to as being in the rearward direction.

As bracket 12 is fixedly connected to platform 10 and LEDs 14 and 16 are fixedly connected to bracket 12 the light sources 14 and 16 rotate in accordance with rotation of platform 10. Further, it is to be noted that the light beam from LED 14 will always be directed outwardly from the beacon as the platform 10 rotates.

Subassembly 8 also includes a reflector system, typically a compound reflector system, comprising a relatively larger concave reflector 18 and a relatively smaller inner reflector 20 connected to platform 10 for rotation in unison therewith. Concave reflector 18 is located further away from bracket 12 and hence from LED 16 than is inner reflector 20. Further concave reflector 18 and inner reflector 20 are located concentrically with each other to assist in focusing and changing the direction of the beam of light from LED 16. As the reflector assembly is fixedly connected to rotating platform 10, the sub assembly 8 comprising the light sources 14, 16 and the reflectors 18, 20 all rotate in unison as an integral unit in accordance with rotation of platform 10. LED 16 towards reflectors 20 and inner reflector 20 are arranged such that light emitted in a substantially rearwardly direction from rear LED 16 is reflected through about 180° or thereabouts to emerge substantially in the same direction as the direction of beam from LED 14 for transmission through the wall of lens 6. The beam from LED 14 is directly transmitted and not reflected by the reflector assembly whereas the beam from LED 16 is reflected. The reflected beam from LED 16 forms the second component of the overall or combined beam being transmitted by beacon 2 whereas the direct beam from LED 14 is the first component of the light from beacon 2. thus, the light flash from this form of the beacon is produced from two separate light sources.

A pair of electrical connectors 22, 24 are provided for facilitating connection of electrical wires to the LEDs.

A pair of resistors 26 are provided adjacent or associated with each electrical connection for the LEDs. An individual resistor 26 is provided in the circuit for each LED to provide a higher level of component reliability in that failure of one resistor and/or its associated LED will still allow the other LED to operate thereby providing enhanced fail safe operation of the beacon 2. Alternatively, single or dual LED drive circuits of an electronic design may be employed to further increase the efficiency of the LED's. Therefore, by having two different light sources, the beacon of the present invention is more reliable.

With particular reference to FIG. 2 the internal componentary located within hollow base 4 will now be described in more detail.

An electrical motor 30 is fixedly connected to the under side of base 4. An output shaft (not shown) extends from motor 30 and is provided with a pulley or similar drive element around which a endless belt (not shown) is located. The endless belt is also looped around a drive cone (not shown) centrally located on the underside of platform 10 to drive platform 10. In operation motor 30 causes rotation of platform 10 and its associated components through the endless belt. Power from an external power source such as mains power or an internal power source such as a rechargeable battery or the like (not shown) is provided to terminals 28a, 28b of motor 30.

A pair of brush housings 32, 34 is provided for housing brushes 36, 38 respectively. The brush housings are in electrical connection with the terminals 28a, 28b of motor 30. Brush 36 is in electrical contact with a lower slip ring 40 whereas brush 38 is in electrical contact with upper slip ring 42.

Slip rings 40, 42 are separated from each other by insulating washer 44 so that the two slip rings are electrically insulated from each other. Each slip ring 40, 42 is provided with a centrally located aperture (not shown) which are in register with each other. A shaft 46 is received through the aligned pair of apertures. Shaft 46 is keyed within the apertures so that the slip rings rotate in accordance with rotation of shaft 46. Shaft 46 extends through a clearance hole in the upper surface of base 4 and terminates in the drive cone connected to the center of platform 10 for rotating this platform. Thus, shaft 46, slip rings 40, 42 all rotate in unison when driven by electric motor 30.

A pair of insulated electrical conductors 48, 50 are provided with conductor 48 connected to slip ring 42 and conductor 50 connected to slip ring 40. Electrical conductors 48, 50 are connected to electrical connectors 22, 24 mounted on the upper surface of platform 10 to transmit current to assist in transmission of power to LEDs 14, 16.

In operation of the beacon of the present invention power either from an internal power source or an external power source is provided to one of the terminals 28a, 28b of motor 30. This same terminal is in electrical connection with brush housing 32 and brush 36 for providing power to slip ring 40. Power from slip ring 40 is conveyed through insulated conductor 50 to electrical connector 24 and then to both LEDs 14, 16 from which beams of illumination are emitted in opposite directions. The electrical circuit is completed by a wire leading from LEDs 14, 16 through one of the resistors 26 to connector 22 then through insulated electrical conductor 48 to slip ring 42, brush 38, brush housing 34 to return to the other terminal of motor 30 and back to the power source to complete the circuit. Simultaneously with the LEDs being energised motor 30 is also energised.

When motor 30 is energized it rotates to drive rotating platform 10 through a suitable drive mechanism such as the pulley, endless belt, drive cone and shaft as previously described. As platform 10 rotates so does subassembly 8 including reflector subassembly and the LEDs.

As beacon 2 is energized light is emitted from forward LED 14 through lens 6 to extend directly radially outwardly from beacon 2 i.e. in the forward direction. The light from LED 16 (i.e. in the rear direction) is reflected back from reflectors 18 and 20 to form a further beam of light transmitted through lens 6, i.e. the reflected beam which is now in the same direction as the beam from LED 14. The two beams of light combine to form the rotating illumination transmitted by beacon 2.

Therefore, in full operation a directional beam of light comprising the background light produced by LED 16 which is reflected from revolving reflector combination 18, 20 and the direct light output from the revolving LED 14 are combined and transmitted radially outwardly substantially in the same direction as each other or in a direction which is substantially parallel to each other. This direction coincides with the forwardly facing direction of the concave face of the reflector. As the assembly 8 rotates it appears to a stationary observer as repeated flashes of visible light, each comprising in sequence a first less intense background illumination, then a brighter more concentrated flash of light, creating an optical sensation similar to the exposed filament of an incandescent sourced beacon, followed again by a brief period of background illumination. Thus, the beacon has the appearance of a flashing beacon emitting repeating high intensity light flashes periodically. The frequency of the flashes is in accordance with the speed of rotation of the platform 10 which can be adjusted in accordance with requirements.

In addition to the embodiment described in this application which utilizes visible LEDs, other embodiments may alternatively, without detracting from the form of the invention, utilize similar or different forms of devices emitting infra red, ultra violet, or other wavelengths in the electromagnetic spectrum.

Advantages of at least some of the devices of the present invention include at least one or more of the following:

The warning device of the present invention in the form of the flashing beacon provides:

- a much needed step forward for obtaining optimum practical utilisation of an alternative directional light source having a very much greater operating life than typical incandescent bulbs, in order to overcome or greatly reduce a very common form of standard incandescent beacon failure. As hazard beacons are commonly used to warn of hazards to life, extending the time between failure directly reduces the risk of inadvertent injury or death to those exposed to the hazard, as well as reducing maintenance and replacement costs.
- a means for significantly lowering the light source power requirement from about 35-70+ watts typical for incandescent devices down to only about 2-5 watts, but importantly whilst also attaining a similar high visual impact of the intensity of light of a typical incandescent beacon.
- a novel means for simulating and attaining the visual impact of an incandescent rotating beacon using, in one embodiment, only two Light Emitting Diodes, rather than a static array of a multitude of LEDs as typically used in the present prior art which can require the use of arrays containing over 100 individual LEDs, in order to produce a visual output which still falls well short of the visual impact of the incandescent devices.
- a means for attaining a similar visual impact to an incandescent beacon, without much of the energy loss in unwanted heat as is generated within conventional incandescent beacons.
- a means for attaining a similar visual impact to an incandescent beacon in a beacon that can be readily and much more easily powered from far smaller capacity batteries than equivalent incandescent units, and with far smaller recharging currents, as are more readily available from smaller and lower cost power sources, such as solar panels and the like. This offers significant advantages for fixed remote unattended applications such as the use of warning beacons in road, rail or similar applications.
- a means for attaining a similar visual impact to an incandescent beacon, which unlike conventional beacons, may be powered from mains power by utilising a light duty 12V DC plug pack power source of 0.5 amp capacity, rather than having to use large, costly and relatively heavy DC power supplies capable of delivering in the order of 75 watts or more.
- a means for attaining a similar visual impact to a conventional incandescent beacon, which may be powered using very light capacity low cost DC cable over greater distances, or from a range of low power output capacity ancillary power or control equipment that would not typically have the capacity to power conventional incandescent beacons.
- all the aforementioned features together with an inherent fail-safe mechanism such that the contingency of failure of one light source alone still allows a useable degree of emitted illumination from the beacon such as will enable the device to continue to fulfill its function of warning of a hazard, until corrective maintenance can be carried out.

As the total light source is formed from a combination of two active emitting devices, then the present invention also achieves a higher degree of reliability and safety over conventional incandescent beacons or beacons with similarly intense optical performance, as the contingency of failure of one of the sources still allows one source to remain illuminated. Thus the present invention not only enhances the safety role of the class of devices characterised in optical performance similar to incandescent hazard beacons by greatly extending the effective life of the light source, but also by providing an inherent fail-safe feature.

It is to be understood that, if any prior art publication is referred to herein, such reference does not constitute an admission that the publication forms a part of the common general knowledge in the art, in Australia or any other country.

It will be understood to persons skilled in the art of the invention that many modifications may be made without departing from the spirit and scope of the invention.

The claims defining the invention are as follows:

1. A warning device characterised in that it is adapted to produce illumination having two or more constituent components, said warning device comprising at least a first component of light from a first light source for producing illumination along a first pathway or in a first direction, a second component of light from a second light source for producing illumination at least initially along a second pathway or in a second direction, said first pathway or direction being different to the initial second pathway or direction, and a light direction changing element for changing the pathway or direction of one of the first or second pathways or directions of illumination to be the same as or similar to the other pathway or direction wherein at least one, and preferably at least two, of the light sources move substantially in accordance with or in unison with movement of the light direction changing element so that illumination comprising the two components of light is emitted from the device in which the first component of light is derived from the first light source and the second component of light is derived from the second light source.

2. The warning device according to claim 1 characterised in that the warning device is a warning beacon, a flashing beacon, a high visibility flashing light beacon, in respect of which the flashes of illumination are observed as pulses, flashes or bursts of light from a position remote from the position of the beacon and from which the beacon is observable.

3. The warning device according to claim 2 characterised in that the flashes, pulses, or bursts of light are in a regularly repeating pattern or sequence.

4. The warning device according to claim 1 characterised in that there are at least two separate light sources in which the first light source produces a uni-directional first beam and the second light source produces a uni-directional second beam.

5. The warning device according to claim 4 characterised in that the first light beam is a radially outwardly directed light beam emitted from the beacon.

6. The warning device according to claim 4 characterised in that the direct beam of illumination from the first light source is a conical beam or similar shape beam of light.

7. The warning device according to claim 4 characterised in that the second light source is initially in the opposite direction to the direction of the first light source being substantially radially inwardly directed of the beacon.

8. The warning device according to claim 7 characterised in that the second light beam is a reflected, refracted beam or beam that undergoes a change or deflection in direction internally within the beacon so as to be emitted from the beacon in the same or substantially the same direction as the first beam is emitted from the beacon.

9. The warning device according claim 1 characterised in that a light source includes a non-incandescent bulb or similar light source including at least one of an LED device, a zenon tube, infrared emitter, laser device or similar.

10. The warning device according to claim 1 in which the light source is LED, preferably a pair of LED's located in back to back relationship so that each LED emits a substantially unidirectional beam of light in opposite directions to each other.

11. The warning device according to claim 10 characterised in that a light from the second or rearwardly or internally directed LED changes is caused to change direction by interaction with the light direction changing element.

12. The warning device according to claim 11 characterised in that the light direction changing element is a reflector, curved reflector, parabolic reflector, compound reflector, simple reflector or similar for changing the direction of the beam of light from the second LED to being the same as or similar to or substantially parallel to the direction of light emitted directly from the first LED.

13. The warning device according to claim 12 characterised in that the reflector is a compound reflector having at least two different reflecting surfaces in which one of the reflecting surfaces is a retro reflector mounted within the other reflecting surface which is a concave reflector.

14. The warning device according to claim 13 characterised in that the retro reflector and concave reflector are located concentrically or coaxially with respect to each other.

15. The warning device according to claim 13 characterised in that the two or more reflectors rotate in unison with each other as a single unit.

16. The warning device according to claim 13 characterised in that the illumination emitted from the beacon is viewed in sequence as a reduced intensity light, followed by a more intense light, following by a further reduced intensity light as the illumination from the beacon is observed to pass a given point with respect to the beacon as the beacon rotates in use.

17. The warning device according to claim 13 characterised in that the first and second LED's and the first and second reflectors rotate in unison with each other about a common axis.

18. The warning device according to claim 13 characterised in that it further comprises a lens through which the combined illumination is passed.

19. The warning device according to claim 13 characterised in that the inwards projecting directionally focused LED projects it light output directly onto the rotating retro reflector surface such that when the reflector combination is observed externally along its focal axis, both the retro reflector surface and the outer metalised reflector rim appears to be brightly and evenly illuminated, even though the LED source is directional and mounted optically close to the combined surface.

20. The warning device according to claim 19 characterised in that the concave reflector and the inner retro reflector are located concentrically with each other to assist in focussing and changing the direction of the beam of light from the second light source.

21. The method of warning of an incident or event using a warning device characterised in that the warning device is in accordance with claim 1.

* * * * *